(12) United States Patent
Murray et al.

(10) Patent No.: US 9,211,848 B2
(45) Date of Patent: Dec. 15, 2015

(54) STORAGE UNIT FOR A MOTOR VEHICLE

(71) Applicant: Ford Global Technologies, LLC, Dearborn, MI (US)

(72) Inventors: Andrew John Murray, Colchester (GB); Bruce Southey, Farnham (GB); James Neugebauer, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/631,921

(22) Filed: Feb. 26, 2015

(65) Prior Publication Data
US 2015/0251606 A1    Sep. 10, 2015

(30) Foreign Application Priority Data

Mar. 4, 2014 (GB) .................... 1403769.1

(51) Int. Cl.
*B60R 11/00* (2006.01)
*B60R 7/04* (2006.01)
*B60R 7/08* (2006.01)
*B60R 7/02* (2006.01)

(52) U.S. Cl.
CPC . *B60R 11/00* (2013.01); *B60R 7/02* (2013.01); *B60R 7/04* (2013.01); *B60R 7/08* (2013.01); *B60R 2011/0007* (2013.01); *B60R 2011/0045* (2013.01); *B60R 2011/0082* (2013.01); *B60R 2011/0084* (2013.01); *B60R 2011/0094* (2013.01)

(58) Field of Classification Search
CPC ............ B60R 11/02; B60R 7/02; B60R 7/04; B60R 7/08
USPC ................ 296/37.1, 37.5, 37.8, 37.12, 37.13, 296/37.15, 37.16
See application file for complete search history.

(56) References Cited

U.S. PATENT DOCUMENTS

| | | | |
|---|---|---|---|
| 3,386,765 A * | 6/1968 | Drach, Jr. .................. | B60R 7/06 296/37.12 |
| 5,795,005 A * | 8/1998 | Garfias .................... | B60R 7/046 220/9.2 |
| 8,210,590 B1 * | 7/2012 | Moberg .................... | B60J 5/042 224/544 |

* cited by examiner

*Primary Examiner* — Joseph D Pape
(74) *Attorney, Agent, or Firm* — Vichit Chea; Price Heneveld LLP

(57) ABSTRACT

A storage assembly for use in a motor vehicle for transporting objects is disclosed. The storage assembly includes upper and lower cover parts that are hingedly connected together and also hingedly connected, via the lower cover part, to an interior panel of the motor vehicle, such as a sidewall of a center console. When the storage assembly is in a stowed configuration, the two upper and lower cover parts are aligned with one another so as to lie substantially flush against the sidewall of the center console. When the storage assembly is in a fully deployed configuration, the upper and lower cover parts are arranged to form a substantially L-shaped support for transporting one or more objects.

13 Claims, 10 Drawing Sheets

STORAGE UNIT FOR A MOTOR VEHICLE

CROSS-REFERENCE TO RELATED APPLICATION

This application claims priority to GB1403769.1, filed on Mar. 4, 2014, the entire contents of which are hereby incorporated herein by reference.

FIELD OF THE INVENTION

The present invention relates to motor vehicles, and, in particular, to a storage assembly for transporting objects in a motor vehicle.

BACKGROUND OF THE INVENTION

It is well known to provide a motor vehicle with a center console that is located between two seats forming a row of front seats. Such a center console normally extends in a longitudinal direction of the motor vehicle and may include an aperture in which is located a gear lever used to select a desired transmission ratio or, in the case of an automatic gearbox, a desired drive mode. Storage space in a passenger compartment of a motor vehicle is often at a premium and this is particularly the case in smaller automobiles. In addition, the storage space that is sometimes provided is not well suited to objects or items people often want to transport such as, for example, a tablet computer, maps, handbags, groceries and take-out food.

It is an object of the invention to provide a motor vehicle center console having a storage assembly for use in transporting objects.

SUMMARY OF THE INVENTION

According to one aspect of the invention there is provided a storage assembly for a motor vehicle comprising upper and lower covers that are hingedly connected to one another, the lower cover being hingedly connected at one edge to the upper cover so as to permit relative rotation between the upper and lower covers about a first substantially horizontally disposed pivot axis and is pivotally connected to the motor vehicle at a second edge so as to permit rotation of the lower cover about a second substantially horizontally disposed pivot axis wherein, when the storage assembly is in a closed configuration, both of the covers lie one above the other substantially flush with an interior panel of the motor vehicle and, when the storage assembly is in a fully deployed configuration, the lower cover extends outwardly from the interior panel in a substantially horizontal direction so as to form a base of an open ended compartment for transporting one or more objects and the upper cover is displaced away from the interior panel to form a substantially vertically arranged outer sidewall of the open ended compartment for transporting said one or more objects.

Advantageously, the lower cover may be hingedly connected to the upper cover at a position of pivotal connection that is spaced away from a lower edge of the upper cover so that the upper cover has a portion that extends upwardly from the position of pivotal connection to the lower cover to form the outer sidewall and a portion that extends downwardly from the position of pivotal connection to the lower cover to form a ground support for the storage assembly when the storage assembly is in the fully deployed configuration.

The interior panel may be a sidewall of a center console.

When the storage assembly is in the fully deployed configuration, the lower cover may be arranged relative to the upper cover to form a substantially L-shaped support for transporting said one or more objects.

The upper cover may have a front end connected to a support member by a front control arm, a rear end connected to the support member by a rear control arm and the two control arms, the lower cover, the upper cover and the support member may form, a pair of four bar linkages used to control the movement of the upper and lower covers.

The interior panel may have a recess and the support member may be a part of the sidewall of the center console located within the recess.

The storage assembly may include a pocket attached to the support member for storing small items.

The storage assembly may include a latch mechanism to selectively hold the upper and lower covers in at least the stowed configuration.

The latch mechanism may also be arranged to selectively hold the upper and lower covers in a partially deployed configuration.

The pocket may be a sprung loaded pocket used to bias the upper and lower covers into the partially deployed configuration when the latch mechanism is temporarily released.

The lower cover may define a bottle holder for use in transporting a bottle when the storage assembly is in the fully deployed configuration.

According to a second aspect of the invention there is provided a motor vehicle having a storage assembly constructed in accordance with said first aspect of the invention.

The motor vehicle may have a passenger compartment in which is mounted a center console and the storage assembly may be located on a passenger foot well side of the center console.

When the storage assembly is deployed, the two cover parts may be arranged substantially normal to one another to form an L-shaped support that projects into the passenger foot well to define the compartment for use in transporting objects.

According to another aspect of the present invention, a storage assembly for a motor vehicle includes a cover assembly coupled to a sidewall of the motor vehicle. The cover assembly is operable between stowed and deployed positions relative to the sidewall. A movement control mechanism includes one or more control arms, and the control arms are coupled to a storage space at a first end and further coupled to the cover assembly at a second end. A latching mechanism is disposed on the cover assembly and configured to retain the cover assembly in the stowed position.

According to another aspect of the present invention, a storage assembly for a motor vehicle includes a cover assembly operably coupled to a sidewall between stowed and deployed positions. The cover assembly includes upper and lower cover parts which are hingedly connected to one another. The cover assembly covers a storage space when in the stowed position. The lower cover part is substantially horizontal and the upper cover part is substantially vertical when the cover assembly is in the deployed position.

According to yet another aspect of the present invention, a storage for a motor vehicle includes a cover assembly operably coupled to a sidewall and having upper and lower cover parts hingedly connected to one another. The upper cover part includes an end portion defining a ground support when the cover assembly is in a deployed position. The upper and lower cover parts are substantially perpendicular to one another when the cover assembly is in the deployed position.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4b is a fragmentary top plan view of a latch arm forming part of the storage assembly shown in FIGS. 3 and 4a;

FIG. 5b is an enlarged perspective view of the detent mechanism of FIG. 5a taken at region "A" shown on FIG. 5a;

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
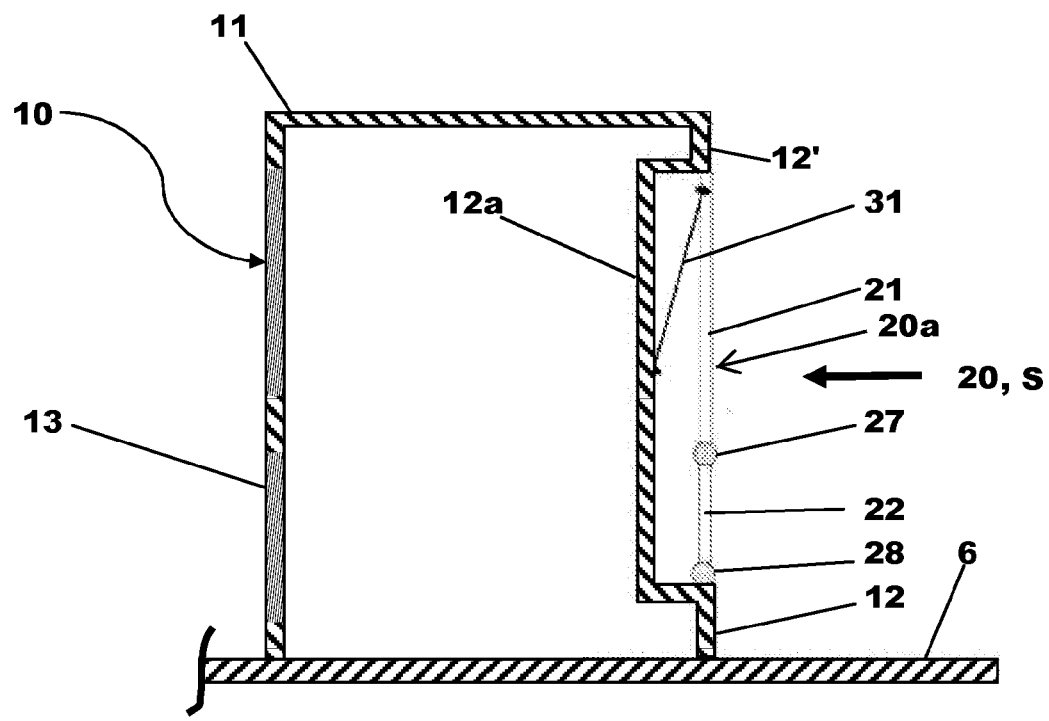
FIG. 1a is a cross-sectional view of a motor vehicle center console having a storage assembly in a stowed configuration according to an embodiment of the present invention.
Figure 1B:
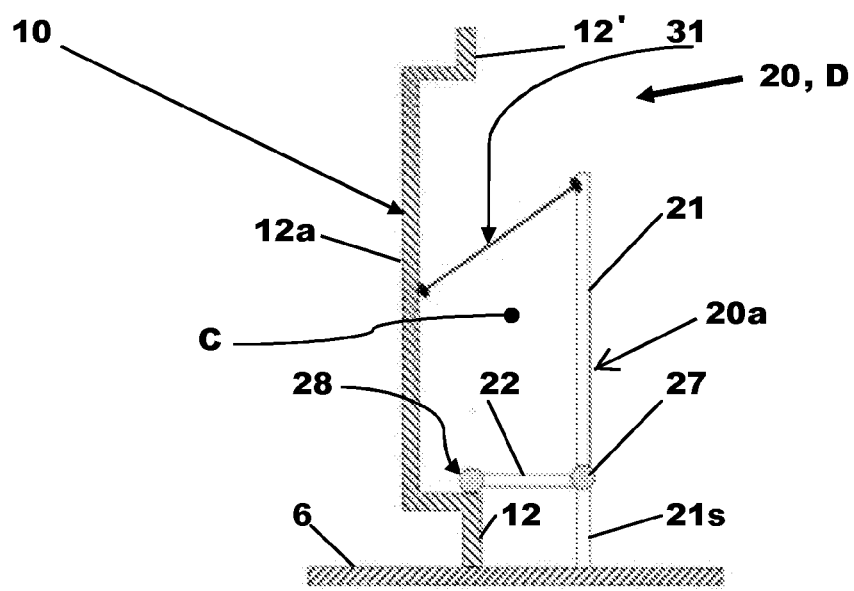
FIG. 1b is a cross-sectional view of a portion of the center console of FIG. 1a, showing the storage assembly in a fully deployed configuration.
Figure 3:
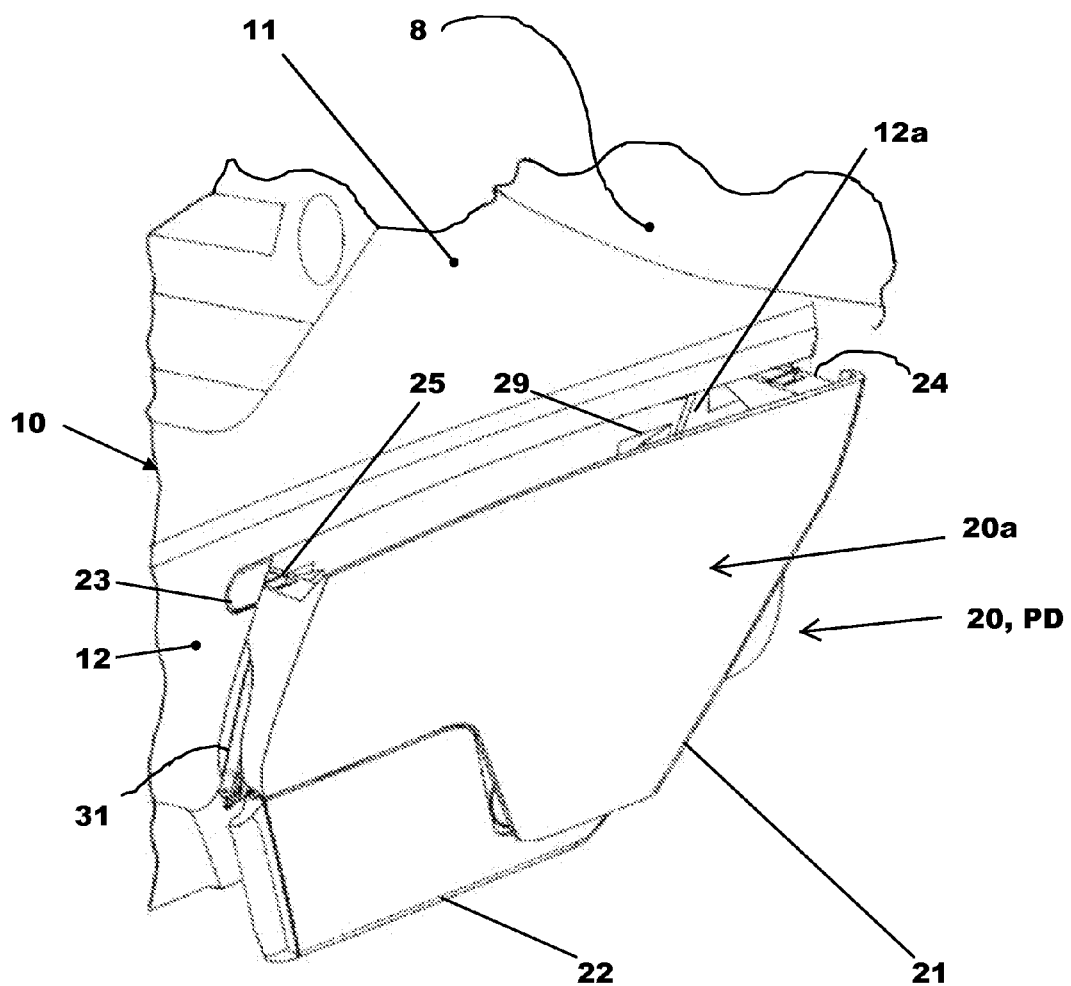
FIG. 3 is a fragmentary perspective view of the storage assembly shown in FIG. 2 showing the storage assembly in a partially deployed configuration.

With particular reference to FIGS. 1a and 1b, a motor vehicle center console 10 is shown having a storage assembly 20. The center console 10 has two opposing sidewalls 12 and 13 and an upper wall 11. The sidewalls 12, 13 and upper wall 11 are contemplated to be formed as a single unitary plastic component, formed by injection molding or other like procedure. In the embodiment shown in FIGS. 1a and 1b, sidewall 12 faces towards a passenger's side of a passenger compartment of a motor vehicle and sidewall 13 faces towards a driver's side of the passenger compartment. Thus, in this case, the motor vehicle depicted in FIGS. 1a and 1b is contemplated to be a left hand drive motor vehicle. The storage assembly 20 includes a two-part cover assembly 20a defined by upper and lower cover parts 21 and 22 which are pivotally connected to one another by a common hinge 27. A movement control mechanism is defined by a pair of control arms 31, 32 (FIG. 4a) of which only the control arm 31 is visible in FIGS. 1a, 1b. A latching mechanism 40 (FIG. 5a) is also provided to hold the cover assembly 20a in a stowed or closed configuration S as shown in FIG. 1a. The latching mechanism 40 may also be used to latch or hold the cover assembly 20a in a partially deployed configuration PD, as shown in FIG. 3. As used throughout this disclosure the upper and lower cover parts 21 and 22 of the two-part cover assembly 20a are referred to as 'cover parts' because they cover the linkages, latch mechanisms and any structural supports of the storage assembly 20 when the storage assembly 20 is in the stowed configuration S.

Figure 4A:
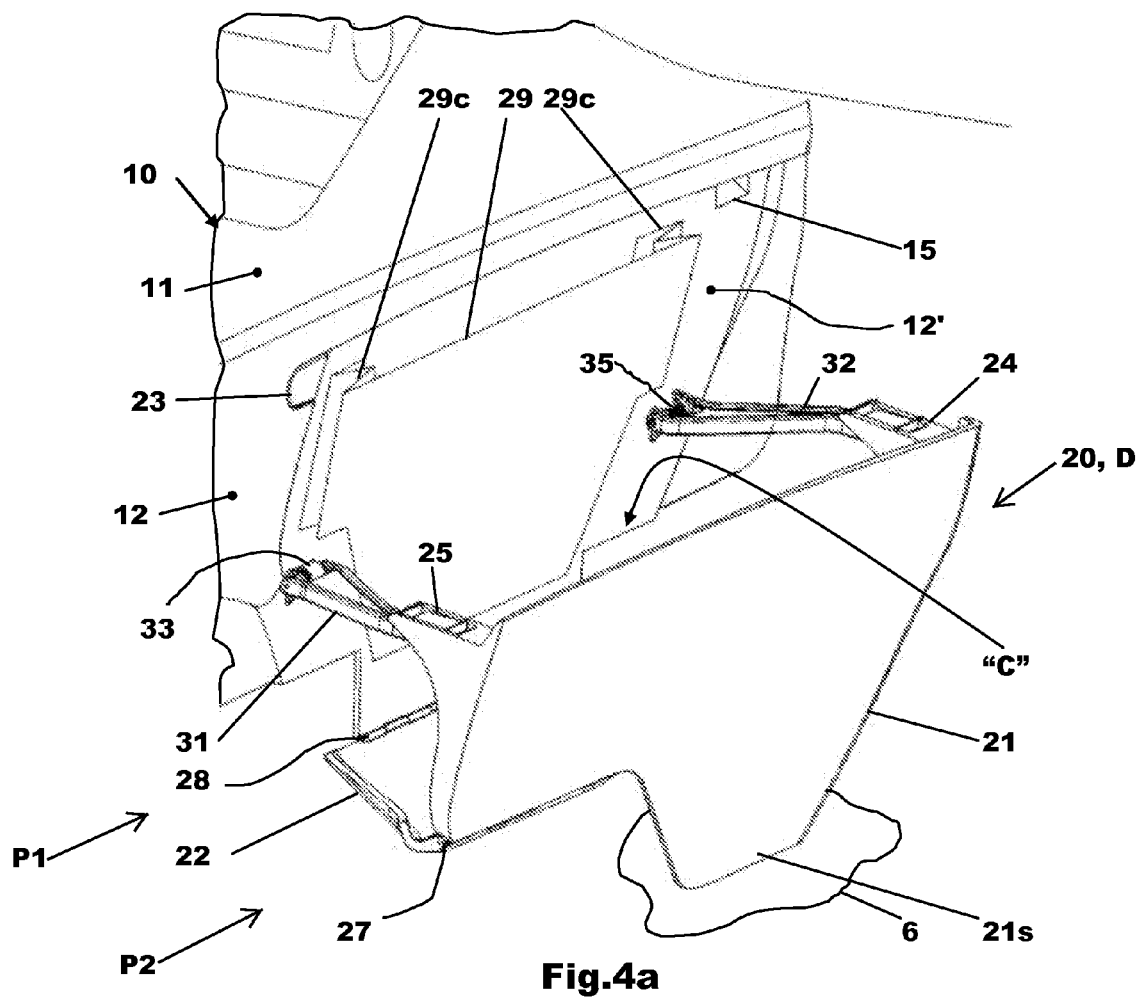
FIG. 4a is a fragmentary perspective view of the storage assembly shown in FIGS. 2 and 3, showing the storage assembly in a fully deployed configuration.

As shown in FIGS. 1a, 1b and 4a, the lower cover part 22 is pivotally connected at a first edge to a sidewall 12 of the center console 10 by a hinged connection 28 for rotation about a substantially horizontally disposed second pivot axis P2 (FIG. 4a). The lower cover part 22 is further pivotally connected on an opposite or second edge to the upper cover part 21 via the common hinge 27 for rotation about a substantially horizontally disposed first pivot axis P1 (FIG. 4a). The first and second pivot axes P1, P2 are arranged substantially parallel to one another, such that when the upper and lower cover parts 21 and 22 are moved between the stowed position S and the deployed position D, there is substantially no lateral movement of the upper and lower cover parts 21 and 22. The lower cover part 22 is therefore hingedly connected at one edge to the upper cover part 21 so as to permit relative rotation between the upper and lower cover parts 21 and 22 about the first substantially horizontally disposed pivot axis P1. As used herein the terms "deployed configuration" and "stowed configuration" refer to deployed and stowed positions of the storage assembly 20 and cover assembly 20a.

As further shown in FIGS. 1a, 1b, the first edge of the lower cover part 22 defines a lower edge of the lower cover part 22 when the storage assembly 20 is in the stowed configuration S. The first edge of the lower cover part 22 further defines an inner edge of the lower cover part 22 when the storage assembly 20 is in the deployed configuration D. The second edge of the lower cover part 22 is an upper edge of the lower cover part 22 when the storage assembly is in the stowed configuration and an outer edge of the lower cover part 22 when the storage assembly is in a deployed configuration.

As shown in FIGS. 1*a* and 1*b*, sidewall 12 is shaped so as to provide a shallow recess or storage space 12*a* in which the arms 31, 32 (FIG. 4*a*) of the movement control mechanism and the latching mechanism 40 (FIG. 5*a*) can be stowed. This permits the two-part cover assembly 20*a*, when in the stowed configuration S, to lie substantially flush to the adjacent sidewall 12 of the center console 10, thereby forming a substantially continuous outer surface. Thus, as shown in FIG. 1*a*, when the storage assembly 20 is in a stowed or closed configuration S, the upper and lower cover parts 21 and 22 are aligned with one another so as to lie one above the other and extend in a vertical direction so as to match or blend with an adjacent outer surface 12' of the sidewall 12 of the center console 10, while covering the storage space 12*a*. Further, as shown in FIG. 1*b*, when the storage assembly 20 is in an 'in-use' or fully deployed configuration D, the upper and lower cover parts 21 and 22 are arranged substantially perpendicularly with respect to one another so that they form an L-shaped support defining, in combination with the sidewall 12, a compartment "C" in which objects can be stored and transported. That is to say, the upper and lower cover parts 21 and 22 of the cover assembly 20*a* form a substantially vertically arranged side support and a substantially horizontally arranged base or floor support respectively when the two-part cover assembly 20*a* is in the fully deployed configuration D.

The common hinge 27 in this case connects one edge of the lower cover part 22 to an intermediate position on the upper cover part 21 so that, when the cover assembly 20*a* is moved to the deployed configuration D shown in FIG. 1*b*, an end portion 21*s* of the upper cover part 21 forms a ground support that rests upon a floor surface 6 of the motor vehicle to which the center console 10 is fitted. It will be appreciated that the end portion 21*s* could extend for the full length of the upper cover part 21.

In an alternative embodiment the common hinge 27 may connect one edge of the lower cover part 22 to a complementary edge of the upper cover part 21. In such a case, the lower cover part 22 may abut directly against or rest upon the floor 6 when the cover assembly 20*a* is in the fully deployed configuration D or may be spaced away from the floor 6 if the hinged connection to the sidewall 12 is located above the level of the floor 6. In such a configuration, the range of movement of the upper and lower cover parts 21, 22 would be limited by the control arms 31, 32.

It will be appreciated that each of the control arms 31, 32 forms, in combination with the upper and lower cover parts 21 and 22 and the sidewall 12 of the center console 10, a four bar linkage, which controls the movement of the upper and lower cover parts 21 and 22 with respect to the sidewall 12. The two control arms 31, 32, the lower cover 22, the upper cover 21 and the support member, in the form of the sidewall 12, therefore, form a pair of four bar linkages used to control the movement of the upper and lower cover parts 21 and 22 between the stowed and deployed positions S, D.

When in the fully deployed configuration D as shown in FIG. 1*b*, the upper cover part 21 is displaced outwardly from an outer surface 12' of the sidewall 12 of the center console 10 to define a compartment "C" for transporting items. When in the stowed or closed configuration S (FIG. 1*a*), the upper and lower cover parts 21 and 22 lie substantially flush with respect to the outer surface 12' of the sidewall 12 of the center console 10.

A latching mechanism, such as latching mechanism 25 (FIG. 3), is used to hold the cover assembly 20*a* in the stowed configuration S and, when the latching mechanism is released, a biasing mechanism, such as a spring, may be used to urge the upper cover part 21 away from the sidewall 12 of the center console 10. In this way, the two-part cover assembly 20*a* will then either transition to the fully deployed configuration D by the effect of gravity, in which case a motion damper mechanism may be provided to control the transition or be manually transitioned to the fully deployed configuration D for receiving and transporting an object.

With reference to FIGS. 2-8, an embodiment of a center console 10 is shown, having a storage assembly 20 constructed in accordance with the principles previously discussed above with respect to FIGS. 1*a* and 1*b*, and for which corresponding parts are identified using the same reference numerals.

Figure 2:
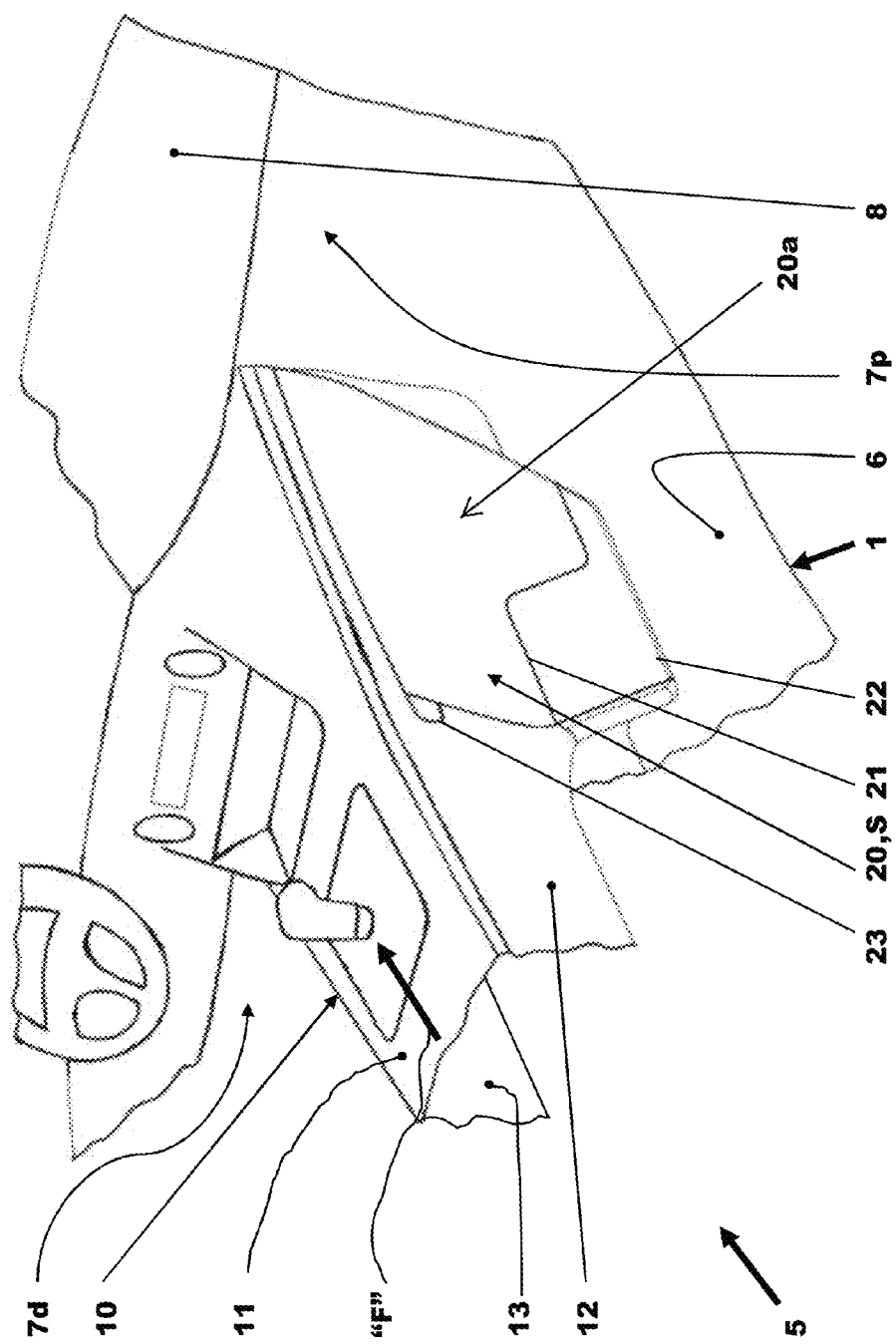
FIG. 2 is a fragmentary perspective view of a passenger compartment of a motor vehicle according to a another embodiment of the present invention having a center console and a storage assembly shown in a stowed configuration.

With specific reference to FIG. 2, a motor vehicle 1 has a passenger compartment 5 including a floor or floorboard 6, a driver foot well 7*d*, a passenger foot well 7*p*, a dashboard 8 and a center console 10. The center console 10 has an upper surface 11 bounded on each longitudinal edge by a respective sidewall 12, 13. The center console 10 extends in a longitudinal direction of the motor vehicle 1 and at least at a front end is positioned between the driver and passenger foot wells 7*d* and 7*p*. The arrow "F", as shown in FIG. 2, is aligned with a longitudinal axis of the motor vehicle 1 and points towards the front of the motor vehicle 1 in a car-forward direction.

As further shown in FIG. 2, a storage assembly 20 is disposed on the sidewall 12 facing the side of the passenger compartments which is configured to be occupied by a passenger that is to say, on the passenger foot well 7*p* side of the center console 10. The storage assembly 20 is designed so that, when in a stowed configuration S shown in FIG. 2, the storage assembly 20 has no significant effect or impact on the space available in the passenger foot well 7*p* region of the passenger compartment 5. That is to say, the storage assembly 20 does not significantly intrude into the space provided for a passenger. However, when the storage assembly 20 is fully deployed, it extends or projects into the passenger foot well 7*p* so as to utilize a portion of the space provided in the passenger foot well 7*p*. In this way, the storage assembly 20 provides a compartment or facility for transporting objects and is accessible from above and which is easily reached by a driver or passenger of the motor vehicle 1.

As shown in FIG. 2, the storage assembly 20 is in a closed or stowed configuration S, in which the upper and lower cover parts 21 and 22 of the two-part cover assembly 20*a* are aligned with one another, so as to lie one above the other and extend in a vertical direction so as to match or blend with an adjacent outer surface 12' of the sidewall 12 of the center console 10. In this embodiment, it is contemplated that the upper and lower cover parts 21 and 22 are formed as continuous sheets of plastic material having a decorative finish on the respective sides facing the passenger foot well 7*p*, also known as the A-side, when the storage assembly 20 is in a stowed configuration S. However, it will be appreciated that apertures could be formed in one or both of the upper and lower cover parts 21 and 22 or a lattice like structure bounded by a structurally rigid border could be used. Whatever the construction used, each of the upper and lower cover parts 21, 22 must be sufficiently rigid to provide the support necessary when the storage assembly 20 is configured for the transporting of an object. Further, the upper and lower cover parts 21, 22 should be relatively thin to reduce any intrusion into the passenger foot well 7*p* when the storage assembly 20 is in the stowed configuration S.

As further shown in FIG. 2, a release button 23 is disposed on the outer surface 12' of the storage assembly 20 for operating a latch mechanism 40. The release button 23 is shown located near to an upper rear corner of the upper cover part 21. It will however be appreciated that the invention is not limited to the use of such a release button 23, and that the release button 23 could be located elsewhere on the center console 10, such as, for example, in the upper surface 11 of the center console 10 or a different type of latch mechanism could be used requiring a slide operated input. As yet another alternative, an electro-mechanical release mechanism could be used allowing the two-part cover assembly 20a to be remotely released by operating a switch or the like.

In FIG. 3 the storage assembly 20 is shown in a partially deployed configuration PD in which access is provided to a pocket 29 attached to the sidewall 12 in the storage space 12a so as to be covered by the upper and lower cover parts 21 and 22 of the two-part cover assembly 20a when the storage assembly 20 is in the stowed configuration S (FIG. 2). The pocket 29 is useful for transporting objects such as, for example, a tablet computer, wallet, notebook or a similarly sized object when the storage assembly 20 is in the partially deployed configuration PD. In another arrangement it may be possible to store such an object in the pocket 29 when the storage assembly 20 is in the stowed configuration S, but the primary use of the pocket 29 is for the temporary storage of an object so as to enable the object to be transported while remaining easily accessible to the vehicle occupants.

Referring now to FIG. 4a, the pocket 29 has corrugated end portions 29c and the upper ends of these corrugated end portions 29c include small steel springs (not shown) used to bias the upper cover part 21 away from the sidewall 12 when the latch mechanism 40 (FIG. 5a) is released by a user pressing the release button 23. If a sprung pocket is not provided, then a spring biasing device, or some other mechanism, will need to be provided to initiate initial opening of the storage assembly 20 when the release button 23 is pressed. As further shown in FIG. 4a, the upper cover part 21 includes front and rear latch arms 24, 25 for cooperation with pawls 41, 42 formed as part of the latch mechanism 40 and best shown in FIG. 5a. The latch arms 24, 25 permit the two-part cover assembly 20a to be latched in either the stowed configuration S (FIG. 2) or the partially deployed configuration PD (FIG. 3) as will be described in more detail hereinafter.

As previously discussed with respect to FIGS. 1a and 1b, the upper and lower cover parts 21 and 22 are pivotally connected to one another by a common hinge 27 for rotation about a substantially horizontally disposed first pivot axis P1 (FIG. 4a). The lower cover part 22 is pivotally connected by a hinge 28 for rotation about a substantially horizontally disposed second pivot axis P2 (FIG. 4a) to the sidewall 12 of the center console 10. The lower cover part 22 is therefore hingedly connected at one edge to the upper cover part 21 so as to permit relative rotation between the upper and lower cover parts 21 and 22 about the first substantially horizontally disposed pivot axis P1. As before, the two pivot axes P1, P2 are arranged substantially parallel to one another so that when the upper and lower cover parts 21 and 22 are moved between the stowed and deployed positions S, D, there is substantially no lateral movement of the upper and lower cover parts 21 and 22.

A movement control mechanism is defined by a pair of control arms 31, 32, of which only the control arm 31 is visible in FIG. 3, and controls the movement of the upper and lower cover parts 21 and 22 between the stowed and deployed positions S, D.

In the partially deployed configuration PD shown in FIG. 3, the upper cover part 21 has pivoted relative to the lower cover part 22 so that an upper edge of the upper cover part 21 has been displaced away from the sidewall 12 thereby providing access, from above, to the pocket 29.

Referring now to FIG. 4a, the storage assembly 20 is shown in a fully deployed configuration D in which the upper cover part 21 is vertically disposed and is displaced a considerable distance from the sidewall 12. In the fully deployed configuration D, the lower cover part 22 is substantially horizontally disposed so as to form a floor or base for an open ended storage compartment "C" defined between the upper cover part 21, which forms an outer sidewall of the compartment "C", and the sidewall 12, which forms an inner sidewall for the compartment "C". Therefore, when the storage assembly 20 is in the fully deployed configuration D, the lower cover 22 and the upper cover 21 provide, in combination, a compartment "C" for transporting one or more objects. It will be appreciated that the pocket 29 can also be accessed while the storage assembly 20 is in the fully deployed configuration D.

As further shown in FIG. 4a, with the common hinge 27 connecting one edge of the lower cover part 22 to an intermediate position on the upper cover part 21, an end portion 21s of the upper cover part 21 is defined and can rest upon a floor 6 of the motor vehicle 1 to which the center console 10 is fitted when the storage assembly 20 is in the fully deployed configuration D. In this way, the end portion 21s provides an outboard support for the lower cover part 22 of the storage assembly 20. It will be appreciated that the end portion 21s could extend for the full length of the upper cover part 21. In the fully deployed configuration D, the upper and lower cover parts 21 and 22 are arranged in an L-shaped configuration when viewed from a front end of the storage assembly 20 to form a substantially vertical sidewall and a substantially horizontal base wall, respectively, for the storage assembly 20. Further, in the fully deployed configuration D the two latch arms 24, 25 are disengaged from the latch mechanism 40 (FIG. 5a) and the orientation of the upper cover part 21 is controlled by the control arms 31, 32. The rear control arm 31 is pivotally connected at one end to a rear upper end of the upper cover part 21 via the latch arm 25, and is pivotally connected at a distal end to either the sidewall 12 or storage space 12a via a pivot connection 33 and the front control arm 32 is pivotally connected at one end to a front upper end of the upper cover part 21 via the latch arm 24 and is pivotally connected at a distal end to the sidewall 12 via a pivot connection 35.

Each of the control arms 31, 32 forms, in combination with the upper and lower cover parts 21 and 22 and the sidewall 12 of the center console 10 to which it is connected, a four bar linkage which controls the movement of the upper and lower cover parts 21 and 22 with respect to the sidewall 12. Therefore, control of the motion of the upper and lower cover parts 21 and 22 is defined by a pair of four bar linkages. It will be appreciated that, when in the fully deployed configuration D, the control arms 31, 32 form end restraints for the compartment "C". Therefore, if an object, such as a bag, is placed in the compartment "C", any longitudinal movement of the bag in a fore-aft direction of the motor vehicle 1 is constrained by the two control arms 31, 32.

When the storage assembly 20 is in the closed or stowed configuration S, each of the front and rear latch arms 24, 25 engages with a respective aperture 15 in the sidewall 12 (of which only one is visible on FIG. 4a), thereby allowing the upper cover part 21 to stow and latch against the sidewall 12.

Figure 4B:
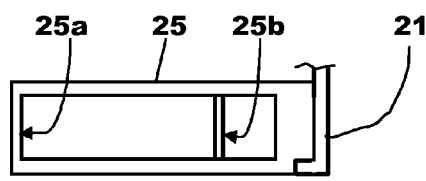

Referring now to FIG. 4b, the rear latch arm 25 is shown in more detail. The rear latch arm 25 is formed as an integral part of the upper cover part 21 and defines two latching surfaces 25a, 25b. When a pawl 41 of the latch mechanism 40 (FIG. 5a) engages with the first latch surface 25a, the two-part cover assembly 20a is positioned in the partially deployed configuration PD, as shown in FIG. 3. When the pawl 41 of the latch mechanism 40 engages with the second latch surface 25b, the two-part cover assembly 20a is positioned in the stowed or closed configuration S, as shown in FIG. 2. As previously discussed, the two latch arms 24, 25 are disengaged from the latch mechanism 40 when the storage assembly 20 is positioned in the fully deployed configuration D.

Figure 5A:
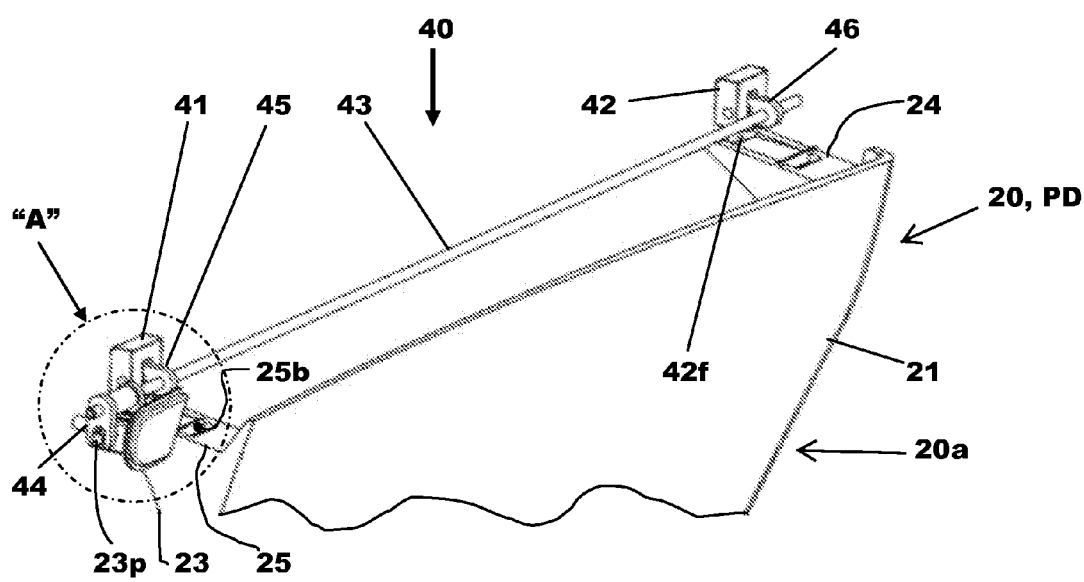
FIG. 5a is a fragmentary perspective view of a detent mechanism configured for use with the storage assembly shown in FIGS. 2-4b.
Figure 5B:
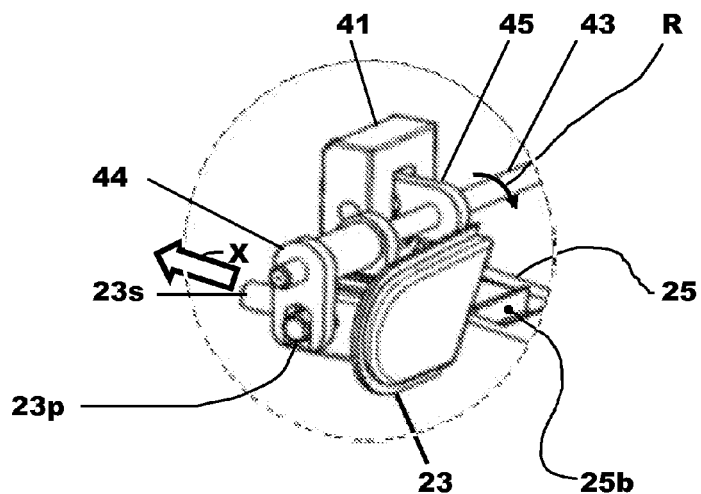

With particular reference to FIGS. 5a and 5b, the latch mechanism 40 used to latch the two-part cover assembly 20a in the stowed and partially deployed configurations S, PD is shown. The latch mechanism 40 comprises of two spaced apart pawls 41, 42, each of which is positioned for engagement with a respective one of the latch arms 25, 24 when the two-part cover assembly 20a is in either the stowed or partially deployed configurations S, PD. Each of the pawls 41, 42 is moveably supported in a channel (not shown) formed as part of the center console 10. In FIGS. 5a and 5b the latch arms 24, 25 are shown with the two-part cover assembly 20a in the partially deployed configuration PD. A finger on the pawl 41 (not visible on FIGS. 5a and 5b) is engaged with the first latch surface 25a (FIG. 4b) and a finger 42f on the pawl 42 (visible only on FIG. 5a) is engaged with a corresponding first latch surface on the front latch arm 24.

As further shown in FIGS. 5a, 5b, the two pawls 41, 42 are interconnected by a rod or shaft 43 to which they are connected by respective link arms 45, 46. Each of the link arms 45, 46 is fixed fast at one end to the rod 43 and is connected at a distal end to the respective pawl 41, 42 that it operates via a pin fixed to the respective pawl 41, 42. Each of the connections allows both rotational and sliding movement between the respective link arm 44, 45 and the pawl 42, 41 that it operates. At one end the rod 43 has a fork arm 44 fixed thereto to provide a connection between the rod 43 and the release button 23. The release button 23 is slidingly supported in a channel in the sidewall 12 and a compression spring 23s is used to bias the button and the pawls 41, 42 in a latching direction. The release button 23 also has a drive pin 23p projecting in a normal direction to the axial direction of sliding for engagement with a U-shaped recess in the fork arm 44.

When the release button 23 is pressed by a user to cause it to slide axially in the direction of arrow 'X' of FIG. 5b, the drive pin 23p causes the fork arm 44 to rotate the rod 43 in the direction of arrow 'R' in FIG. 5b, thereby releasing the pawls 41, 42 from the latch arms 25, 24. In this case, the compression spring 23s biases the two pawls 41, 42 in a latch arm 25, 24 engaging direction, so that by temporarily pressing the release button 23, the storage assembly 20 moves automatically from the stowed position S to the partially deployed position PD due to the effect of the corrugated steel springs incorporated in the top edges of the two sides 29c of the pocket 29. In other embodiments, separate return springs may be arranged to act directly on the two pawls 41, 42. It is contemplated that if the release button 23 is pressed and held in the pressed position, then the pawls 41, 42 will remain disengaged, thereby allowing the upper and lower cover parts 21 and 22 of the storage assembly 20 to transition to the fully deployed configuration D by the effect of gravity, in which case a motion damper (not shown) is provided to control the transition or be manually moved into the fully deployed configuration D.

Figure 6A:
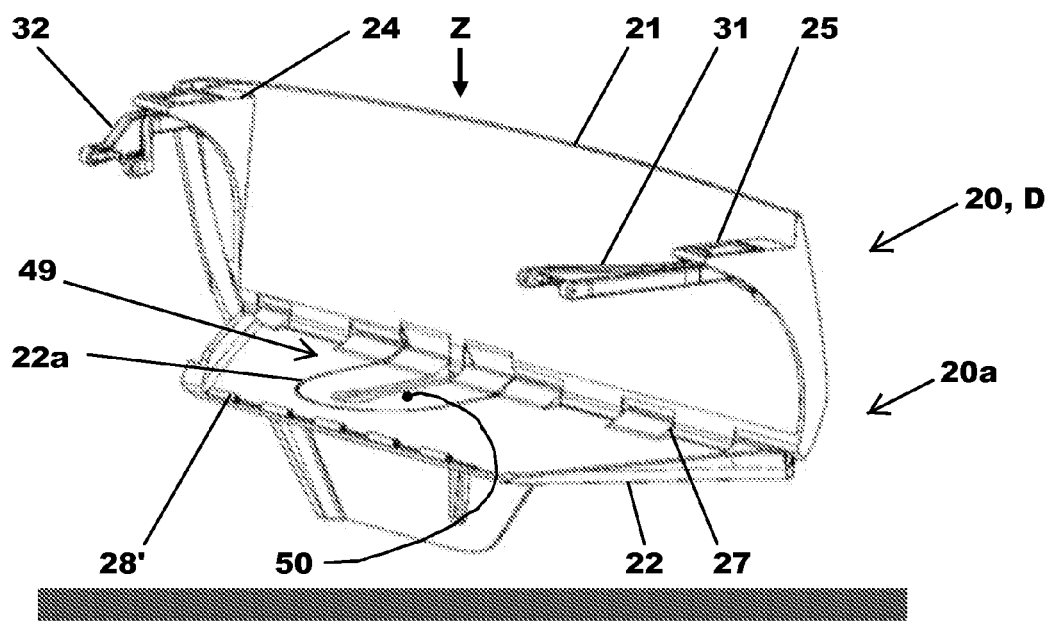
FIG. 6a is a rear perspective view of the storage assembly shown in FIGS. 2-5b showing the storage assembly in a fully deployed configuration.
Figure 6B:
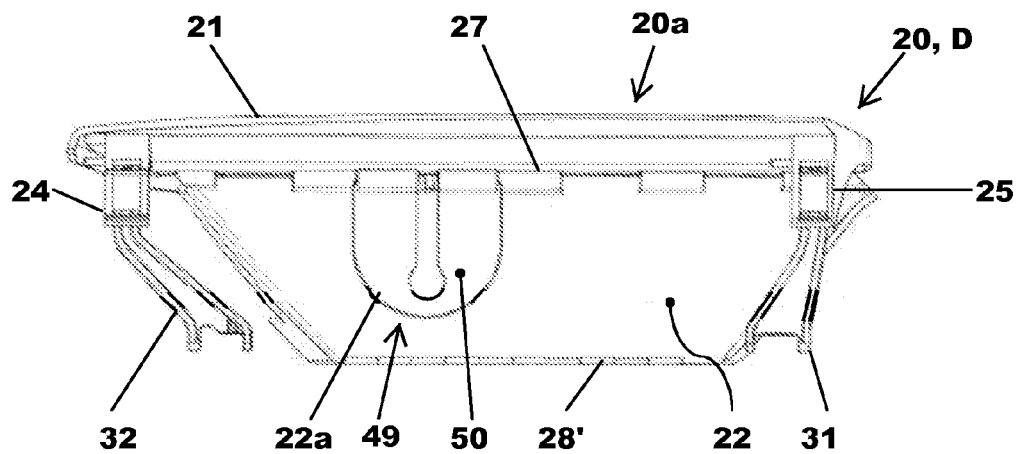
FIG. 6b is a top plan view shown in the direction of arrow Z of FIG. 6a showing the storage assembly in the fully deployed configuration.
Figure 7:
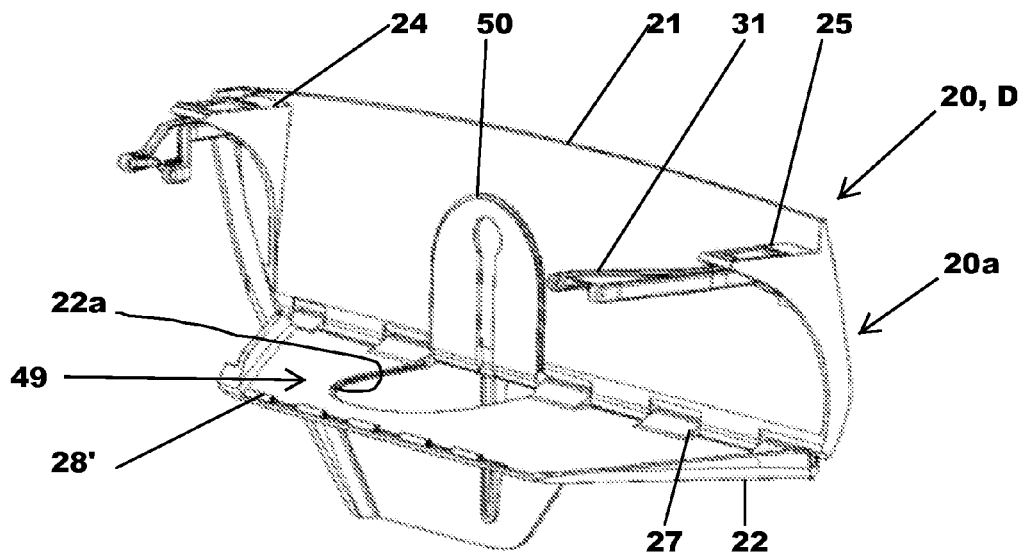
FIG. 7 is a rear perspective view of the storage assembly shown in FIG. 6a, showing a bottle storage flap in a raised position.
Figure 8:
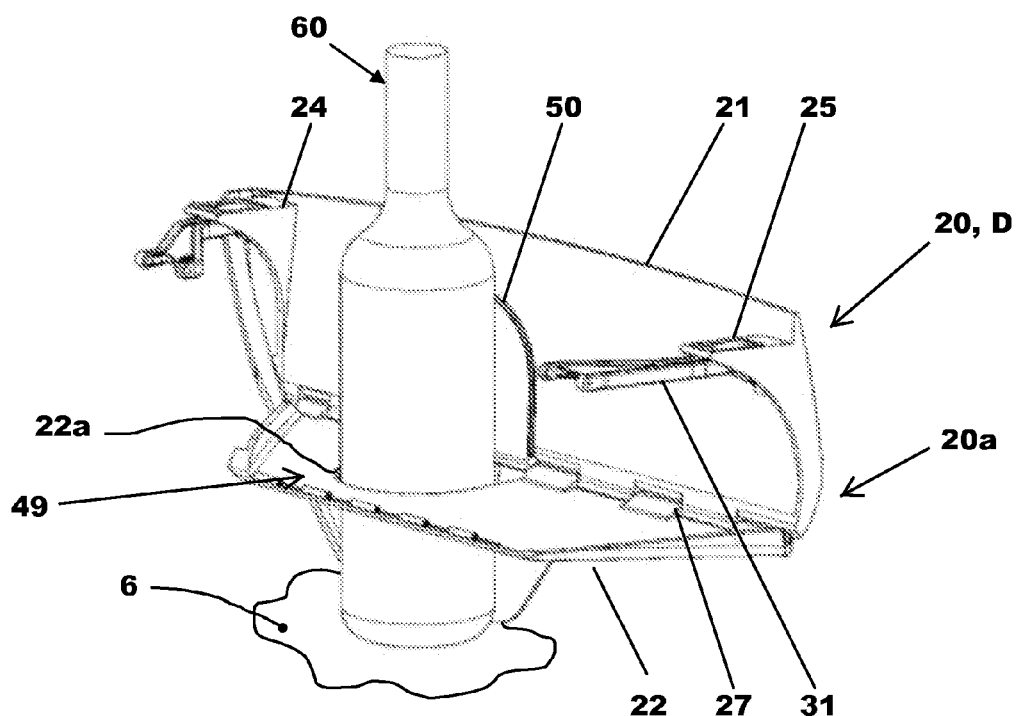
FIG. 8 is a fragmentary rear perspective view of the storage assembly shown in FIG. 7, showing a bottle located in a bottle transportation holder.

Referring now to FIGS. 6a-8, the storage assembly 20 is in the fully deployed configuration D and shown from a reverse angle, so that a bottle holder 49, forming an additional feature of the storage assembly 20, is revealed. The bottle holder 49 is formed by an aperture 22a in the lower cover part 22 that is selectively closed by a cover or lid 50. The lid 50 is pivotally attached to the lower cover part 22 as part of the common hinge 27. In FIGS. 6a and 6b, the lid 50 is shown in a closed position. In FIG. 7, the lid 50 is shown in an open position. In FIG. 8, the lid 50 is shown open with a bottle 60 located in the aperture 22a of the bottle holder 49.

One of the advantages of pivotally connecting the lower cover part 22 at an intermediate position on the upper cover part 21 via the common hinge 27 is that, as previously described, it enables the lower cover part 22 to be raised off the floor 6 of the passenger compartment 5 when the storage assembly 20 is fully deployed. This is because a lower edge of end portion 21s of the upper cover part 21 forms a ground support that engages with a floor surface 6 of the motor vehicle 1 to which the storage assembly 20 is fitted. Providing a space below the lower cover part 22 when the lower cover part 22 is in the fully deployed configuration D, facilitates the use of the lower cover part 22 as a bottle holder 49 in a very simple and economical manner, by requiring only the provision of an aperture 22a in the lower cover part 22. It will be appreciated that the bottle 60 extends through the aperture 22a and rests upon the floor 6 of the motor vehicle 1, as shown in FIG. 8.

In an alternative embodiment (not shown) a bottle holder 49 is formed by an arm pivotally connected to an inner surface of the upper cover part 21. The arm, in this case, defines an aperture in which a bottle can be inserted and stored when the arm is folded out from the upper cover part 21. The bottle will, in this case, rest upon the horizontally disposed lower cover part 22.

In use, from the stowed configuration S, temporarily pressing of the release button 23 by a user will allow the upper cover part 21 to move away from the center console 10 into the partially deployed position PD for access to the pocket 29. If the release button 23 is held in the pressed position, the first latched position (PD) will be passed and the two-part cover assembly 20a can then be transitioned to the fully deployed configuration D either by the effect of gravity, in which case a motion damper (not shown) is provided to control the transition, or manually by a user, in which case the two control arms 31, 32 automatically control movement of the upper and lower cover parts 21 and 22.

By pushing or pulling the upper cover part 21 when the storage assembly 20 is in a fully deployed configuration D, the storage assembly 20 can be transitioned back to the stowed configuration S and the latch mechanism 40 will automatically re-engage to retain the storage assembly 20 in this configuration.

In order to prevent damaging interference between the storage assembly 20 and an adjacent seat when the storage assembly 20 is in the fully deployed configuration D, an interlock may be provided between the storage assembly 20 and a fore-aft seat adjuster for the respective seat. This could be a mechanical interlock or an electro mechanical interlock. Not only could such an interlock be used to prevent adjustment of the seat to a forward position beyond a predefined forward position it could also if required prevent partial or full deployment of the storage assembly 20 if the seat is already in front of the predefined forward position.

Figure 9A:
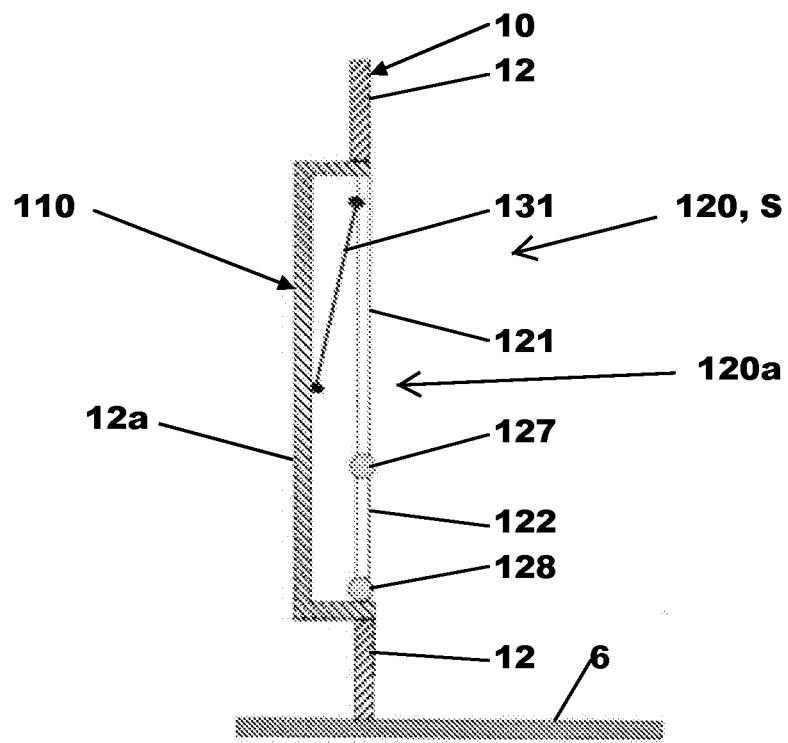
FIG. 9a is a fragmentary cross-sectional view of a portion of a motor vehicle center console having a storage assembly in a stowed configuration according to another embodiment of the present invention.
Figure 9B:
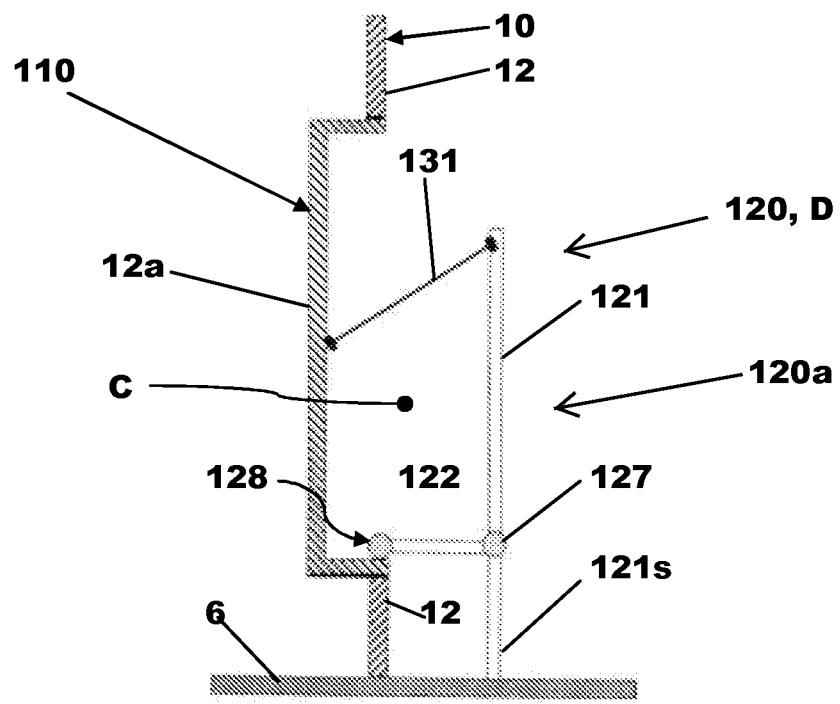
FIG. 9b is a fragmentary cross-sectional view of the center console of FIG. 9a, showing the storage assembly in a fully deployed configuration.

Referring now to FIGS. 9a and 9b, there is shown a second embodiment of a storage assembly 120 for a center console 10 that is, in most respects, the same as the storage assembly 20 previously described with reference to FIGS. 1a and 1b. As before the center console 10 has a sidewall 12, but in this case, the storage assembly 120 is formed as a self-contained unit or cassette that is inserted and secured in an aperture in the sidewall 12 of the center console 10.

The storage assembly 120 comprises a support structure 110 which, in this case, is in the form of a shallow box or storage space having an open side that is covered by upper and lower cover parts 121, 122 of a two-part cover assembly 120a when the storage assembly 120 is in a stowed configuration, as shown in FIG. 9a.

The upper and lower cover parts 121 and 122 are, as previously described, pivotally connected to one another by a common hinge 127 and a movement control mechanism including a pair of control arms 131, 132, of which only the control arm 131 is visible, is used to control movement of the upper and lower cover parts 121, 122. A latching mechanism (not shown) is also provided to hold the cover assembly 120a in a closed or stowed position S, as shown in FIG. 9a.

The lower cover part 122 is pivotally connected at one edge to the support structure 110 by a hinged connection 128 for rotation about a substantially horizontally disposed second pivot axis and is pivotally connected on an opposite edge to the upper cover part 121 via the common hinge 127 for rotation about a substantially horizontally disposed first pivot axis. The first and second pivot axes are arranged substantially parallel to one another and are similar to pivot axes P1, P2 described above with reference to FIG. 4a. The lower cover part 122 is therefore hingedly connected at one edge to the upper cover part 121 so as to permit relative rotation between the upper and lower cover parts 121 and 122 about the first substantially horizontally disposed pivot axis.

Each of the two control arms 131, 132 is also pivotally connected at a respective first end to the support structure 110 and is pivotally connected at a respective second end to the upper cover part 121.

The use of a shallow box for the support structure 110 permits the two-part cover assembly 120a, when in the stowed configuration S (FIG. 9a), to lie substantially flush to the adjacent sidewall 12 of the center console 10, so as to form a substantially continuous surface. This is because the two control arms 131, 132 can be accommodated within the shallow box 110.

When, as shown in FIG. 9a, the storage assembly 120 is in a stowed or closed configuration S, the upper and lower cover parts 121 and 122 are aligned with one another so as to lie one above the other and extend in a vertical direction so as to match or blend with an adjacent outer surface of the sidewall 12 of the center console 10.

When, as shown in FIG. 9b, the storage assembly 120 is in an 'in-use' or fully deployed configuration D, the upper and lower cover parts 121 and 122 are arranged substantially perpendicular to one another, so that they form an L-shaped support defining, in combination with the support structure 110, a compartment "C" in which objects can be transported. That is to say, in the fully deployed configuration D, the upper and lower cover parts 121 and 122 are arranged in an L-shaped configuration when viewed from a front end of the storage assembly 120, to form a substantially vertical sidewall and a substantially horizontal base wall, respectively, for the storage assembly.

As before, the common hinge 127 connects one edge of the lower cover part 122 to an intermediate position on the upper cover part 121 so that, when the storage assembly 120 is moved to the deployed configuration D shown in FIG. 9b, an end portion 121s of the upper cover part 121 forms a ground support that rests upon a floor 6 of the motor vehicle 1 to which the center console 10 is fitted.

One advantage of this embodiment is that the storage assembly 120 can be pre-assembled as a self-contained assembly that can then be subsequently fitted to the center console 10. This provides improved flexibility both in terms of manufacture and design. For example, alternative storage assemblies could be produced having differing features and a customer could then select the storage assembly possessing the features they prefer.

As before, a partially deployed configuration PD could be provided by the use of a latch mechanism and a small pocket could be accessible when in such a partially deployed configuration PD.

Figure 10:
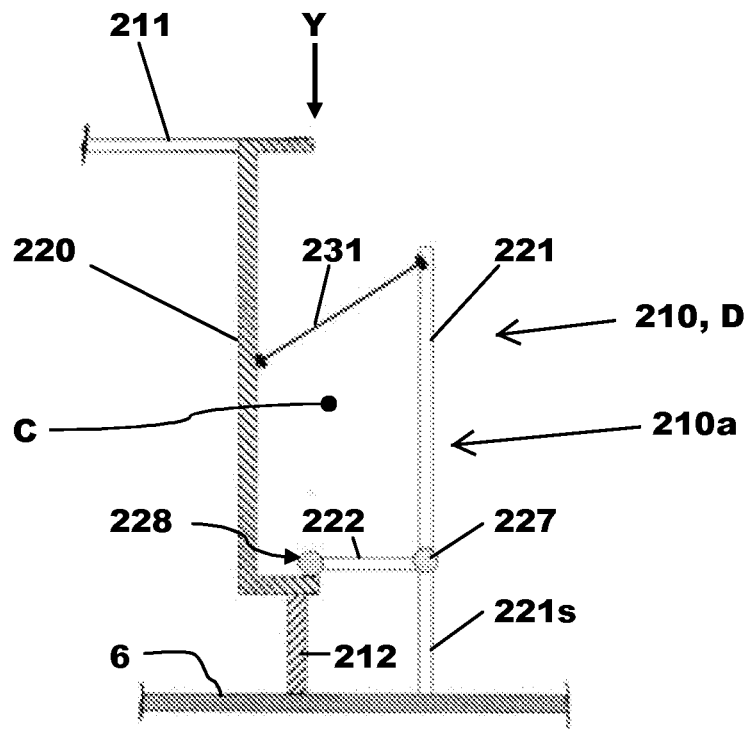
FIG. 10 is a fragmentary cross-sectional view of a portion of a motor vehicle center console having a storage assembly in a fully deployed configuration according to another embodiment of the present invention.
Figure 11:
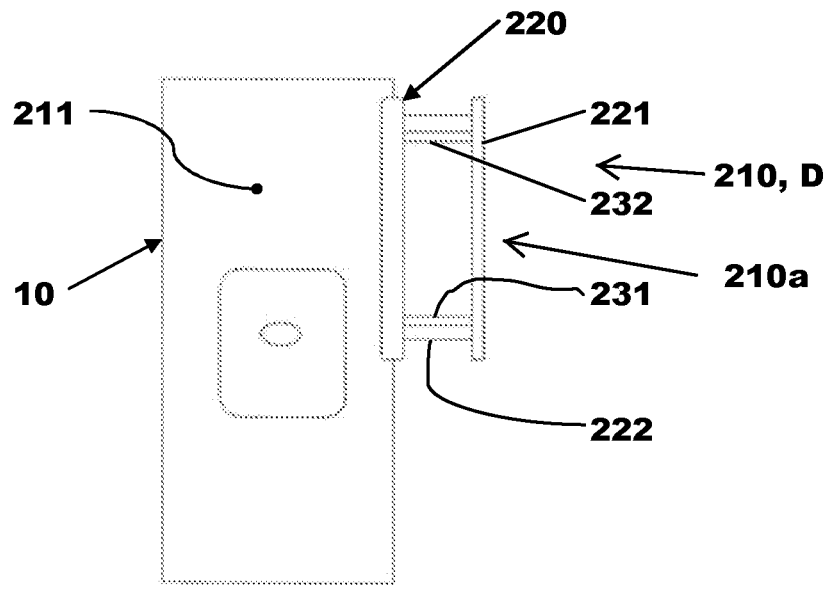
FIG. 11 is a top plan view in the direction of arrow Y of FIG. 10 showing the storage assembly in the fully deployed configuration.

Referring now to FIGS. 10 and 11, a third embodiment of a storage assembly 210 is shown that is, in most respects, the same as storage assembly 120 previously described with reference to FIGS. 9a and 9b. As before, the storage assembly 210 is formed as a self-contained unit or cassette that is secured to a center console 10. The storage assembly 210 comprises a support structure 220 which, in this case, is in the form of a shallow box having an open side that is covered by upper and lower cover parts 221, 222 of a two-part cover assembly 210a when the storage assembly 210 is in a stowed configuration, similar to stowed configuration S shown in FIG. 9a for storage assembly 120. The upper and lower cover parts 221 and 222 are, as previously described, pivotally connected to one another by a common hinge 227 and a movement control mechanism including a pair of control arms 231, 232, of which only the control arm 231 is visible, is used to control movement of the upper and lower cover parts 221, 222. A latch mechanism (not shown) is also provided to hold the cover assembly 210a in a closed or stowed position.

The lower cover part 222 is pivotally connected at one edge to the support structure 220 by a hinged connection 228 for rotation about a substantially horizontally disposed second pivot axis, and is pivotally connected on an opposite edge to the upper cover part 221 via the common hinge 227 for rotation about a substantially horizontally disposed first pivot axis. The first and second pivot axes are arranged substantially parallel to one another and are similar to pivot axes P1, P2 described above with reference to FIG. 4a. The lower cover part 222 is therefore hingedly connected at one edge to the upper cover part 221 so as to permit relative rotation between the upper and lower cover parts 221 and 222 about the first substantially horizontally disposed pivot axis.

The use of a shallow box for the support structure 220 permits the two-part cover assembly 120a, when in the stowed configuration, to have minimal impact on the area in the foot well of the motor vehicle provided for a front seat passenger because the control arms can be stowed within the shallow box. In some embodiments the upper and lower cover parts 221 and 222 may lie substantially flush to the adjacent sidewall 212 of the center console 10 so as to form a substantially continuous surface. When the storage assembly 210 is in a stowed or closed configuration, the upper and lower cover parts 221 and 222 are as previously referred to aligned with one another so as to lie one above the other and extend in a vertical direction.

When, as shown in FIGS. 10 and 11, the storage assembly 210 is in an 'in-use' or fully deployed configuration D, the upper and lower cover parts 221 and 222 are arranged substantially perpendicular to one another, so that they form an L-shaped support defining, in combination with the support structure 220, a compartment "C" in which objects can be transported. That is to say, the upper and lower cover parts 221 and 222 of the cover assembly 210a form side and base supports respectively when the storage assembly 210 is in the fully deployed configuration D.

As before, the common hinge 227 connects one edge of the lower cover part 222 to an intermediate position on the upper cover part 221, so that when the cover assembly 210a is moved to the deployed configuration D shown in FIG. 10, an end portion 221s of the upper cover part 221 forms a ground support that rests upon a floor 6 of the motor vehicle 1 to which the center console 10 is fitted. The difference between this third embodiment of a storage assembly 210 and the second embodiment of a storage assembly 120 previously described with reference to FIGS. 9a and 9b, is that, in the case of this third embodiment 210, the upper surface 211 of the center console 10 is cutaway or recessed to provide for the fitment of the support structure 210. In the second embodiment 120 shown in FIGS. 9a and 9b, the support structure 110 is fitted into an aperture in the sidewall 12 of the center console 10. One advantage of the third embodiment 210 shown in FIGS. 10 and 11, is that the vertical height of the storage assembly 210 is not restricted by the height of the sidewall 212 of the center console 10. That is to say, the storage assembly 210 could, if required, project above the upper surface 211 of the center console 10.

Although the storage assembly of the present invention has thus far been described with reference to particularly advantageous applications of a storage assembly as part of a center console of a motor vehicle, it will be appreciated that a storage assembly constructed in accordance with the invention could also be utilized in other areas of the motor vehicle. For example and without limitation, such a storage assembly could be used on an interior panel of a door of a motor vehicle or in a trunk or luggage compartment of a motor vehicle.

Figure 12:
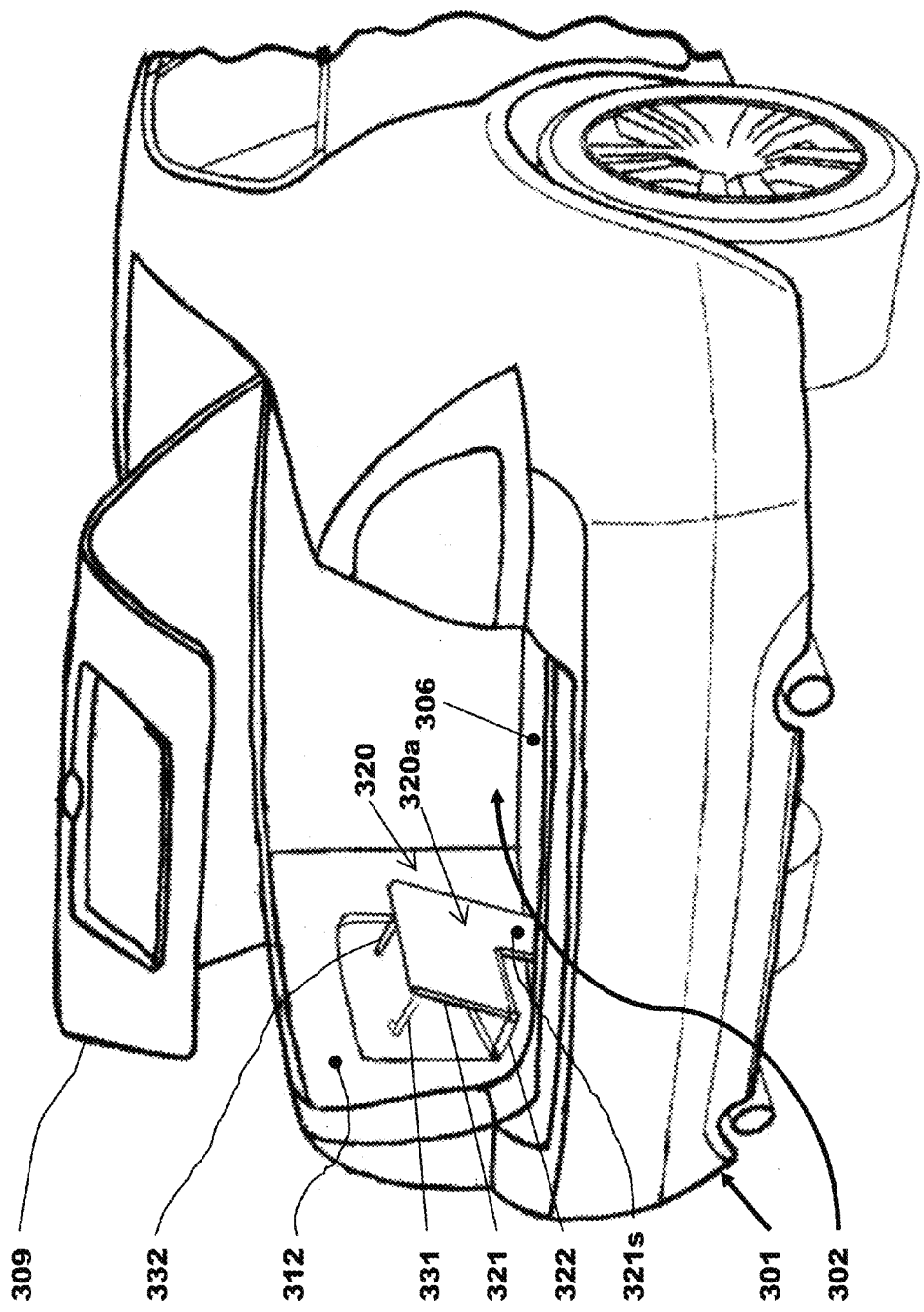
FIG. 12 is a fragmentary perspective view of a rear portion of a motor vehicle showing a storage assembly in accordance with another embodiment of the present invention located on a side panel of a luggage compartment of the motor vehicle.

Referring now to FIG. 12, a storage assembly 320 constructed in accordance with this invention as applied to a side panel 312 of a luggage compartment 302 of a motor vehicle 301. The luggage compartment 302 has a floor 306 and a trunk lid 309 which is shown in FIG. 12 in an open position allowing objects to be placed in or removed from the luggage compartment 302. In manner similar to the storage assemblies 20, 120 and 210 described above, the storage assembly 320 comprises a two-part hinged cover 320a having upper and lower cover parts 321 and 322 hingedly connected together by a common hinge and a movement control mechanism including a pair of control arms 331, 332. A latching mechanism (not shown) is also provided to hold the cover assembly 320a in a stowed configuration (not shown) and may also be used to latch or hold the cover assembly 320a in a partially deployed configuration in a manner similar to that described above. The upper and lower cover parts 321 and 322 are referred to as 'cover parts' because they cover the linkages, latch mechanisms and any structural supports for the storage assembly 320 when the storage assembly 320 is in the stowed configuration.

The lower cover part 322 is pivotally connected at a first edge to the side panel 312 of the luggage compartment 302 by a hinged connection for rotation about a substantially horizontally disposed second pivot axis and is pivotally connected on an opposite or second edge to the upper cover part 321 via the common hinge for rotation about a substantially horizontally disposed first pivot axis. The first and second pivot axes are arranged substantially parallel to one another and are similar to pivot axes P1, P2 described above with reference to FIG. 4a. The lower cover part 322 is therefore hingedly connected at one edge to the upper cover part 321 so as to permit relative rotation between the upper and lower cover parts 321 and 322 about the first substantially horizontally disposed pivot axis. The first edge of the lower cover part 322 is a lower edge of the lower cover part when the storage assembly 320 is in the stowed configuration, and an inner edge of the lower cover part 322 when the storage assembly 320 is in a deployed configuration D, as shown in FIG. 12. The second edge of the lower cover part 322 is an upper edge of the lower cover part 322 when the storage assembly 320 is in the stowed configuration, and an outer edge of the lower cover part 322 when the storage assembly 320 is in the deployed configuration D, shown in FIG. 12.

The side panel 312 is shaped so as to provide a shallow recess in which the movement control mechanism 331, 332 can be stowed. This permits the two-part cover assembly 320a, when in the stowed configuration, to lie substantially flush to the adjacent side panel 312 of the luggage compartment 302. When the storage assembly 320 is in a stowed configuration (not shown), the upper and lower cover parts 321 and 322 are aligned with one another so as to lie one above the other and extend in a substantially vertical direction so as to match or blend with an adjacent outer surface of the side panel 312 of the luggage compartment 302. When, as shown in FIG. 12, the storage assembly 320 is in the fully deployed configuration D, the upper and lower cover parts 321 and 322 are arranged substantially normally with respect to one another so that they form an L-shaped support defining, in combination with the sidewall 312, a compartment in which objects can be transported. That is to say, the upper and lower cover parts 321 and 322 of the cover assembly 320a form side and base supports, respectively, when the two-part cover assembly 320a is in the fully deployed configuration D shown in FIG. 12.

In the example shown in FIG. 12, the common hinge connects the lower cover part 322 to an intermediate position on the upper cover part 321 so that, when the cover assembly 320a is moved to the deployed configuration D, an end portion 321s of the upper cover part 321 rests upon the floor 306 of the luggage compartment 302. It will be appreciated that the end portion 321s could extend for the full length of the upper cover part 321. The two control arms 331, 332, the lower cover 322, the upper cover 321 and the side panel 312 in combination form a pair of four bar linkages used to control the movement of the upper and lower cover parts 321 and 322.

When the storage assembly 320 is in the stowed configuration, both of the upper and lower cover parts 321, 322 of the two-part cover assembly 320a lie adjacent to the side panel 312 of the luggage compartment 302 of the motor vehicle 301. When the storage assembly 320 is in the fully deployed configuration D, the lower cover part 322 extends outwardly from the side panel 312 and the upper cover 321 extends upwardly from the lower cover part 322 and is displaced away from the side panel 312 to provide, in combination with the lower cover part 322, a support for transporting one or more objects.

Therefore, in summary, the invention provides a storage assembly that is of a cost effective and simple construction for use in transporting objects in a motor vehicle. In one particularly advantageous application, the invention provides a multi-stage deployable storage assembly which makes use of space in a passenger foot well of a vehicle in manner that makes it more useful and practical for use when driving alone, while not compromising the space available if a passenger is present. By folding away into a space in the center console, which is not otherwise available for meaningful stowage, the storage system provides an integrated appearance when not in use and provides no intrusion into the space provided for a front seat passenger. An intermediate deployed configuration could also be provided and a small pocket could be accessible when in such a partially deployed configuration and in the fully deployed configuration. Such a storage assembly, when fitted to or incorporated as part of a center console, is convenient for a driver to use if they are travelling alone because the compartment of the storage assembly formed, when the storage assembly is fully deployed, can easily be accessed from an upper end to place objects into or retrieve objects from the compartment.

It will be appreciated by those skilled in the art that although the invention has been described by way of example with reference to one or more embodiments it is not limited to the disclosed embodiments and that alternative embodiments could be constructed without departing from the scope of the invention as defined by the appended claims. It will further be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A storage assembly for a motor vehicle, comprising:
   a cover assembly coupled to a sidewall of a motor vehicle, wherein the cover assembly is operable between stowed and deployed positions relative to the sidewall;
   a movement control mechanism having one or more control arms, wherein the one or more control arms are coupled to a storage space at a first end and further coupled to the cover assembly at a second end;
   a latching mechanism disposed on the cover assembly and configured to retain the cover assembly in the stowed position;
   wherein the cover assembly includes upper and lower cover parts; and
   wherein the upper cover part includes an end portion, the end portion defining a ground support configured to support the cover assembly on a floor surface when the cover assembly is in the deployed position.

2. The storage assembly of claim 1, wherein the upper and lower cover parts are hingedly connected to one another along a first pivot axis.

3. The storage assembly of claim 2, wherein the lower cover part is hingedly connected to the sidewall along a second pivot axis.

4. The storage assembly of claim 3, wherein the lower cover part is substantially horizontal when the cover assembly is in the deployed position.

5. The storage assembly of claim 4, wherein the upper cover part is substantially vertical when the cover assembly is in the deployed position.

6. The storage assembly of claim 1, wherein the cover assembly covers the storage space when in the cover assembly is in the stowed position.

7. The storage assembly of claim 6, wherein the cover assembly is substantially flush with the sidewall when the cover assembly is in the stowed position.

8. The storage assembly of claim 1, including:
   a release button operably coupled to the latching mechanism and configured to release the latching mechanism to move the cover assembly to the deployed position from the stowed position.

9. A storage assembly for a motor vehicle, comprising:
   a cover assembly operably coupled to a sidewall and having upper and lower cover parts hingedly connected to one another, wherein the upper cover part includes an end portion defining a ground support when the cover assembly is in a deployed position, and further wherein the upper and lower cover parts are substantially perpendicular to one another when the cover assembly is in the deployed position.

10. The storage assembly of claim 9, wherein the cover assembly is substantially flush with an outer surface of the sidewall when the cover assembly is in the stowed position.

11. The storage assembly of claim 10, wherein the upper and lower cover parts are hingedly connected to one another along a first pivot axis, and further wherein the lower cover part is hingedly connected to the sidewall along a second pivot axis.

12. The storage assembly of claim 11, wherein the cover assembly is further operable to a partially deployed position, wherein a storage space is accessible when the cover assembly is in the partially deployed position.

13. The storage assembly of claim 9, including:
   an aperture disposed in the lower cover part having a lid configured to selectively close the aperture, wherein the aperture defines a bottle holder with the lid is in an open position.

* * * * *